United States Patent [19]
Eichenhofer

[11] 3,780,924
[45] Dec. 25, 1973

[54] AUTOMATIC BAR FEEDER ATTACHMENT FOR MULTIPLE SPINDLE SCREW MACHINES

[75] Inventor: Josef Eichenhofer, Brampton, Ontario, Canada

[73] Assignee: Automatic Bar Feed Ltd., Ontario, Canada

[22] Filed: May 3, 1971

[21] Appl. No.: 139,696

Related U.S. Application Data
[63] Continuation-in-part of Ser. No. 884,653, Dec. 12, 1969, Pat. No. 3,599,852.

[52] U.S. Cl. ............................................. 226/155
[51] Int. Cl. ........................................... B65h 17/22
[58] Field of Search .................... 226/124, 154, 155

[56] References Cited
UNITED STATES PATENTS
3,203,608   8/1965   Mogolis ............................ 226/124
3,372,449   3/1968   Jamison ......................... 226/155 X Primary Examiner—Allen N. Knowles
Assistant Examiner—Gene A. Church
Attorney—Cumpston, Shaw & Stephens

[57] ABSTRACT

In a spindle bar machine having a hollow spindle through which a workpiece bar is cyclically advanced, a feeder formed of an elongated housing arranged transversely to the bar and rockingly mounted upon a machine shaft by a journal formed upon one end of the housing, with a motor arranged within the housing, and having a constantly rotating drive shaft extending out of the opposite end of the housing and carrying a roller arranged to periodically peripherally engage and longitudinally thrust the bar for advancing it. The housing is rocked about its journal towards and away from the bar by a housing cam follower engaging a machine. This device also includes a pneumatic pushback stop and related control equipment especially designed to fit existing multi-spindle machines.

17 Claims, 13 Drawing Figures

INVENTOR.
JOSEF EICHENHOFER

BY Cumpston, Shaw
and Stephens

ATTORNEYS

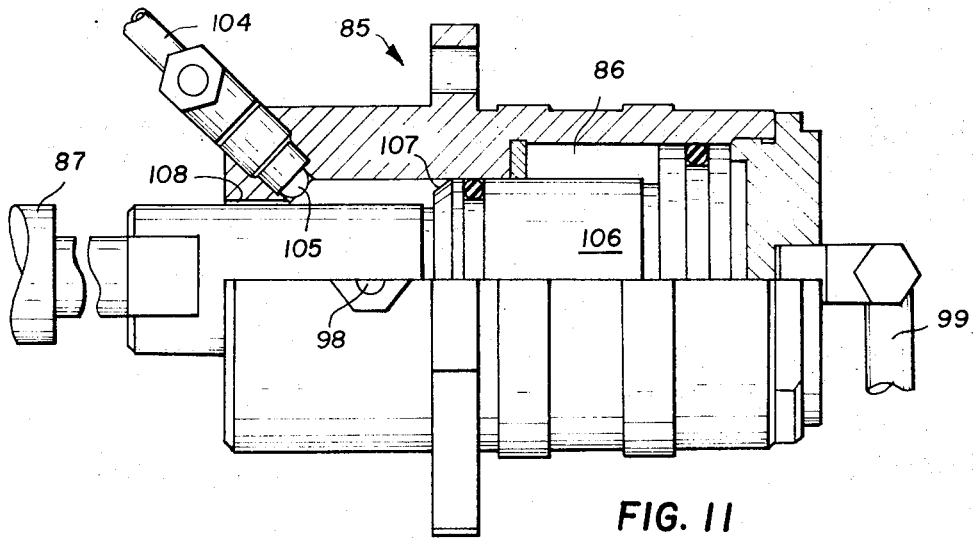
FIG. 11
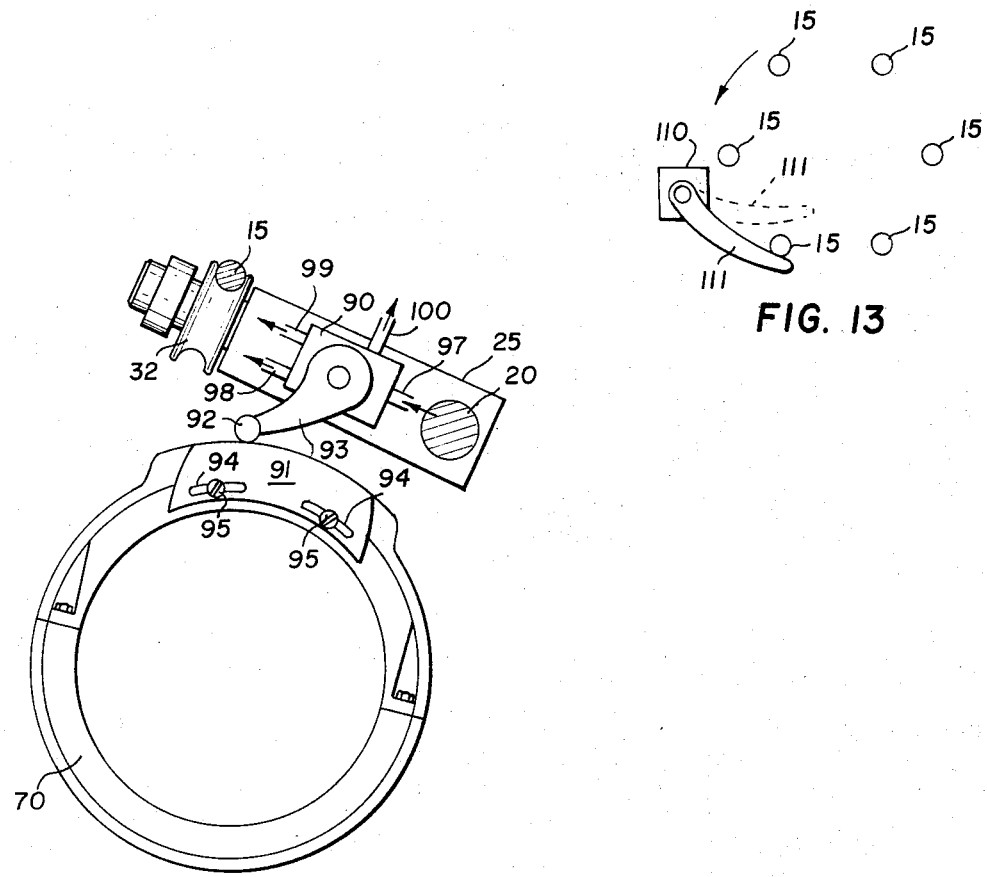
FIG. 12
FIG. 13
INVENTOR.
JOSEF EICHENHOFER
BY Cumpston, Shaw
and Stephens
ATTORNEYS

AUTOMATIC BAR FEEDER ATTACHMENT FOR MULTIPLE SPINDLE SCREW

RELATED APPLICATIONS

This application is a continuation-in-part of my co-pending U.S. application Ser. No. 884,653, filed Dec. 12, 1969, now U.S. Pat. No. 3,599,852.

BACKGROUND OF THE INVENTION

In conventional multiple spindle screw or bar machines, a number of bars or rods are supported within spindles which are advanced or indexed from station to station where various cutting and machining operations are applied to the workpiece. After the bar or rod workpiece is indexed through the various work stations, it is advanced through the spindle so that the next increment of the workpiece may be indexed through the work stations.

In the past, locking and incremental advancing mechanisms were provided using pusher tubes. Thereafter, attempts have been made to provide a continuous drive, advancing or feed mechanism for advancing the bar workpiece at the proper time.

An example of such an automatic feed mechanism is illustrated in the U.S. patent to Mogolis, No. 3,203,608, granted Aug. 31, 1965. Such feed mechanism is relatively complex and requires some modification of the basic spindle machine.

Hence, attempts have been made to form a feed attachment which can be applied to a spindle machine without modifying the machine at all. An example is shown in the U.S. Patent to Jamison, No. 3,372,449, granted Mar. 12, 1968. Here an automatic feed attachment was added to the spindle bar machine which was otherwise unmodified.

The invention herein relates to a further improvement in such an automatic bar feed attachment wherein the feed mechanism is considerably simplified and made more compact and particularly so formed as to absorb considerably greater loads thereby increasing the life of the attachment and reducing maintenance thereon.

The invention also includes a pneumatic push-back stop and a related pneumatic system adapted to fit existing screw machines with very little modification thereof.

SUMMARY OF THE INVENTION

In summary, the invention herein contemplates forming an automatic feed mechanism comprising a housing within which the drive motor is mounted, with one end of the housing formed as a journal for journal mounting upon a support shaft forming part of the spindle machine, and with the drive roller mounted upon the opposite end of the housing and driven constantly by the motor shaft. The roller is mounted upon an outer shaft which fits over and is secured to the motor shaft and which forms part of a cover or end cap which overlaps the housing and which is supported by bearings thereon, thereby transmitting the transverse forces applied to the roller directly to the housing rather than solely to the motor shaft, thus reducing the strain on the motor and prolonging its life.

The housing is rocked towards and away from the workpiece bar by means of a suitable cam follower engaging a cam mounted upon an operating drum driven by the spindle machine. Thus, by properly timing the cam, the roller contacts and longitudinally thrusts and advances the workpiece at the proper time during the cycle where the workpiece is to be advanced.

The overall construction herein is relatively lightweight, compact and easily mountable and removable from the spindle bar machine so that it may be provided as a separate attachment to existing machines.

These and other objects and advantages of this invention become apparent upon reading the following description, of which the attached drawings form a part.

DESCRIPTION OF DRAWINGS:

FIG. 11 is a partially schematic, elevational view of a pneumatic, push-back stop preferred for the invention;

FIG. 12 is a partially schematic, fragmentary elevational view of a cam and follower arrangement for an air valve used in the inventive system; and FIG. 13 is a schematic, fragmentary, elevational view of a sensor and valve used in the inventive system.

Figure 1:
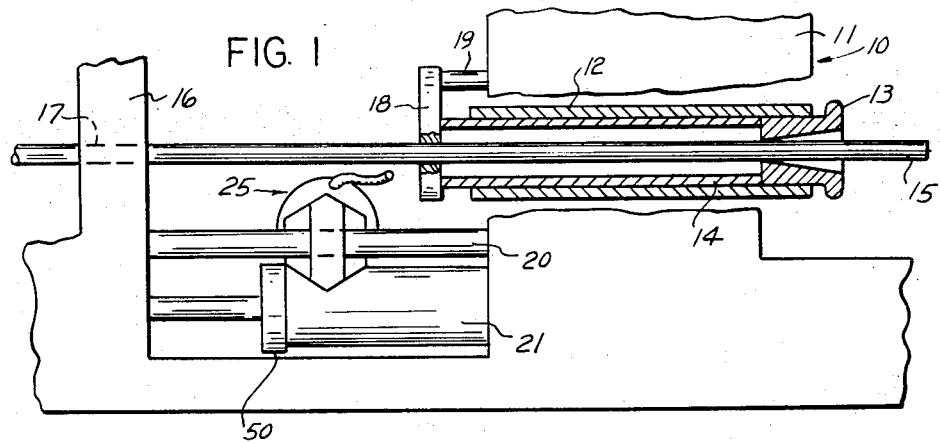
FIG. 1 is a schematic view, partially in cross-section, of a portion of a conventional multiple spindle screw or bar machine.
Figure 2:
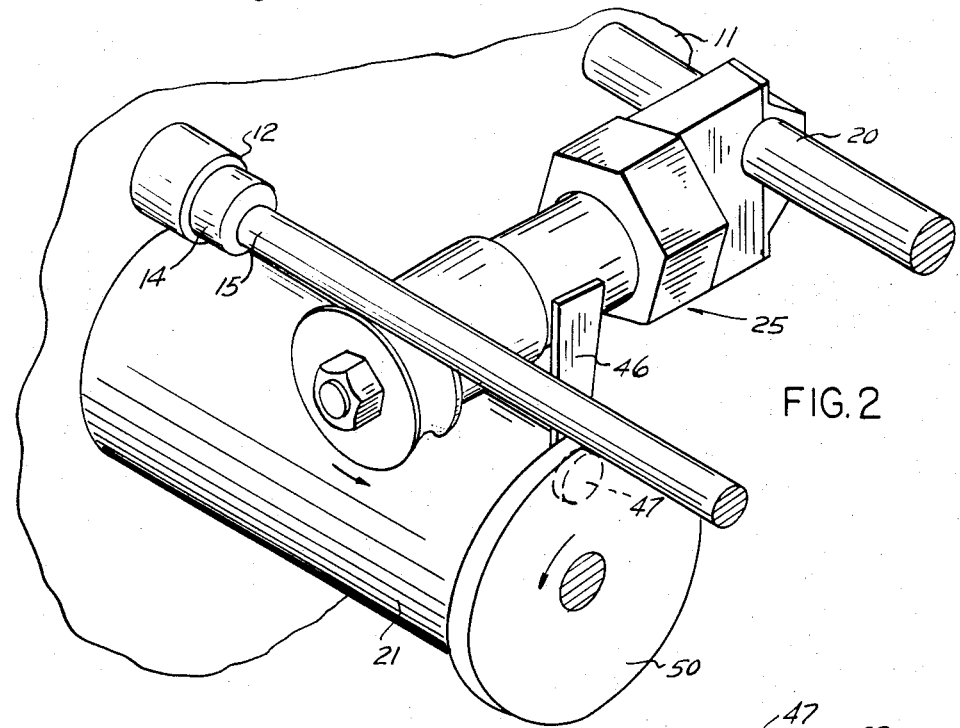
FIG. 2 is a perspective view of a portion of the machine illustrating the attachment herein mounted in operative, bar advancing position.
Figure 3:
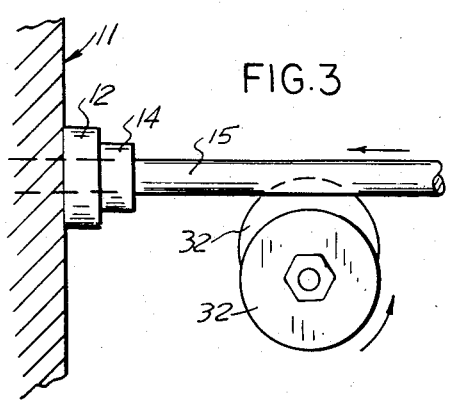
FIG. 3 is a schematic view showing the operation of the drive roller against the workpiece bar.
Figure 4:
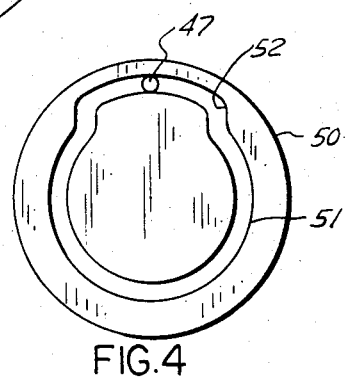
FIG. 4 is an inner face elevational view of the timing cam.

DETAILED DESCRIPTION:

FIG. 1 schematically illustrates a portion of a conventional multiple spindle screw or bar machine generally designated as 10. The portions of such machine which are relevant to the invention herein are generally described as follows:

The machine includes a head stock 11 which contains a number of rotating, hollow, drive spindles 12 each containing a conventional locking collet or chuck 13 operated by a collet control shaft 14 for locking and unlocking against the workpiece bar or rod 15 which extends through the spindle.

Typically, the bar is initially of a considerable length such as in the order of ten feet, and extends rearwardly to a tailstock 16 having suitable journal openings 17 for supporting the end of the bar.

A bracket 18 secured to the collet control shaft is moved forwardly and rearwardly by a drive or operator rod 19 which is controlled by mechanism within the headstock for locking and unlocking the collet 13 during the proper time wherein the bar is to be advanced.

The machine also includes a rearwardly extending machine shaft 20 and a rotatable operating drum 21.

The general operation of this type of macine involves moving the respective spindles, with their locked workpiece bars, through various work stations wherein tooling cuts and otherwise machines the ends of the bars. After completing the indexing cycle, the workpiece returns to the advancement position or loading and unloading position wherein the collet 13 is loosened by moving its control rod towards the right as shown in FIG. 1, then the bar is moved for advancement, also to the right, and then the collet is locked again for again indexing the bar through the work stations.

All of the foregoing mechanism is conventional and does not form any part of this invention and thereby is described only generally and briefly for purposes of understanding the background and use of the invention herein.

The automatic feeder attachment 25 comprises an elongated, cylindrically shaped housing 26 within which a motor 27 is arranged. Preferably, a lightweight, constantly operating pneumatic motor may be used.

The motor drive shaft 28 extends outwardly of one end of the housing, which end is closed by a cup-shaped cap 29 which loosely overlaps the housing and is rotatably supported thereon by means of suitable bearings 30.

The cap is formed with an integral, hollow, stub shaft 31 which receives and is secured to the motor drive shaft 28 for rotation thereby.

Mounted upon the stub shaft 31 is the bar drive roller 32 formed of two roller halves 33–34 arranged face to face with the half 34 in contact with the base of the cap 29.

The roller is secured to the stub shaft 31 by means of a key 35 which permits roller 33 to slide axially of the shaft towards and away from roller half 34.

A peripheral bar receiving groove 36 is formed in the roller, with each half of the roller likewise carrying half of the groove formation.

The roller halves 33-34 are spring urged against the base of the cap 29 be means of a spring 37 preferably formed in the shape of an annular, truncated cone of springy metal. The compressive force of the spring may be adjusted by means of a nut 38 mounted upon the threaded end 39 of the shaft 31.

Figure 5:
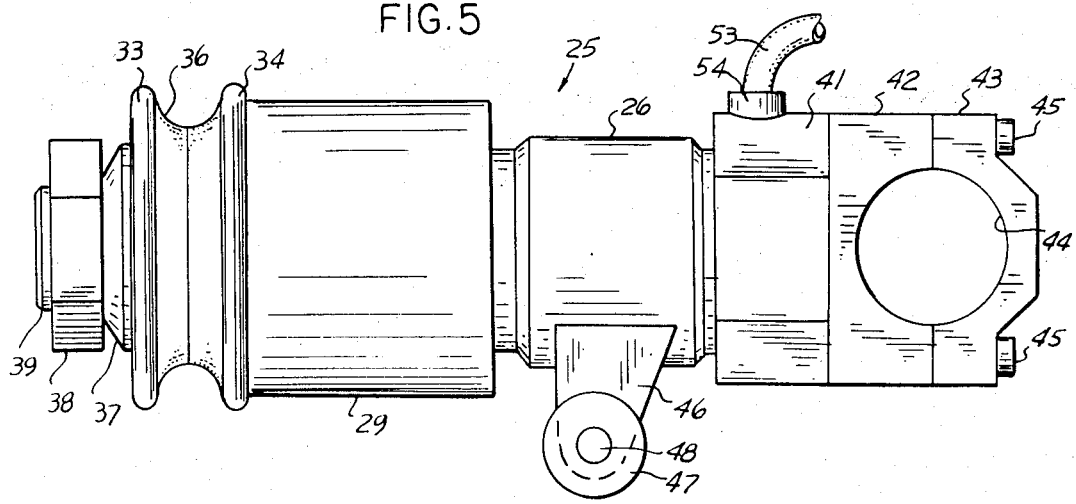
FIG. 5 is an elevational view of the attachment.
Figure 6:
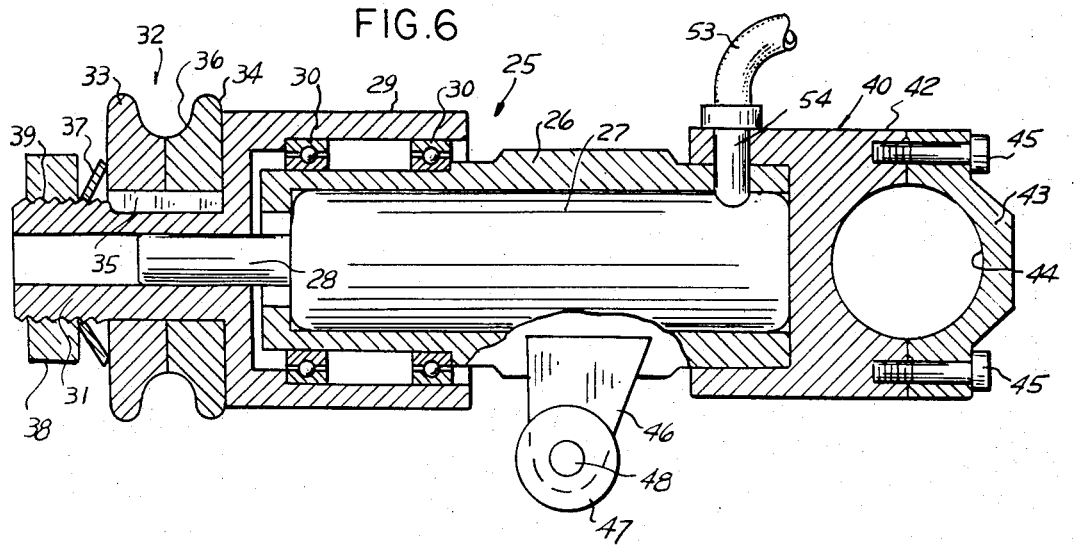
FIG. 6 is a view similar to FIG. 5 but in cross-section.
Figure 7:
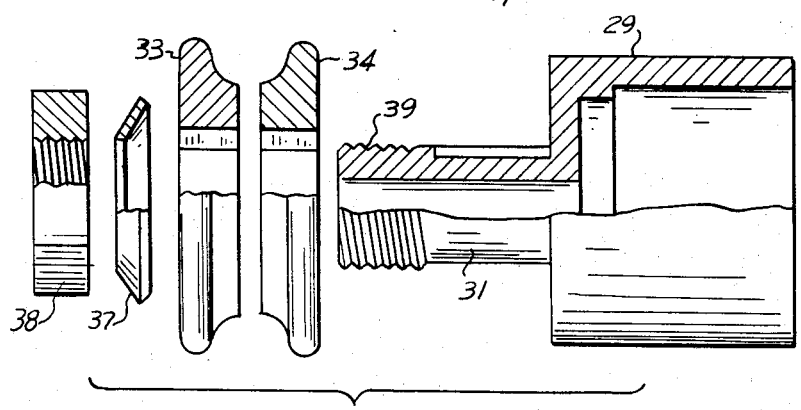
FIG. 7 is an exploded view, partially in cross-section, of several of the parts forming the attachment.

The opposite end of the housing 26 is provided with a closure cap 40 whose forward end is formed as a wrench grasping portion 41 (see FIG. 5) and whose rear end is formed as a journal plate 42 having an end portion or cover 43 suitably bored to provide a journal opening 44 of a size to rotatably receive the machine shaft 20 for mounting the attachment upon the spindle machine.

The cover 43 is secured to the journal plate 42 by means of cap screws 45 or the like so that the attachment may be mounted upon the machine shaft 20 and readily demounted therefrom as desired, for replacement and servicing.

A downwardly extending bracket 46 is secured to the housing and carries a cam follower roller 47 on a roller support shaft 48.

Mounted upon the machine operating drum 21 is a cam 50 having a face opening cam groove 51 with an offset cam portion 52, the groove being dimensioned to receive the cam follower roller 47.

The motor 27 may be powered by a compressed air source transmitting the compressed air through an air hose 53 connected to a fitting 54 extending through the housing and to the motor. Alternatively, a suitable electrically powered motor may be used in place of the pneumatic motor.

OPERATION

In operation, the attachment is rockingly mounted upon the machine shaft 20 by arranging the journal opening 44 around said shaft. Thus, the attachment may rock upwardly and downwardly in a plane transverse to the workpiece bar 15.

The motor 27 is continuously operated so that its shaft 28 rotates the cap 29 and the driver roller 32 mounted thereon.

The cam 50 is so timed that when the collet 13 is unlocked, that is when the workpiece is ready for advancement, the follower roller 47 is moved upwardly by the offset cam portion 52 to thereby rock the housing upwardly, placing the drive roller in peripheral contact with the bar. At that point, the outer roller half 33 may move axially, against the force of the spring 37, away from the inner roller 34 to better grasp the bar and provide a longitudinal or axially directed thrust for advancing the bar. When the collet 13 again locks the bar, the housing is rocked downwardly to end the contact between the roller and bar. The cycle is repeated for each of the bars carried by the spindle machine during the proper sequence of time.

Other improvements in the invention make it more readily adaptable to existing multiple-spindle screw machines, and help the inventive attachment function more reliably, and with greater versatility and efficiency. These improvements are shown in FIGS. 8 - 13 and described below.

Figure 8:
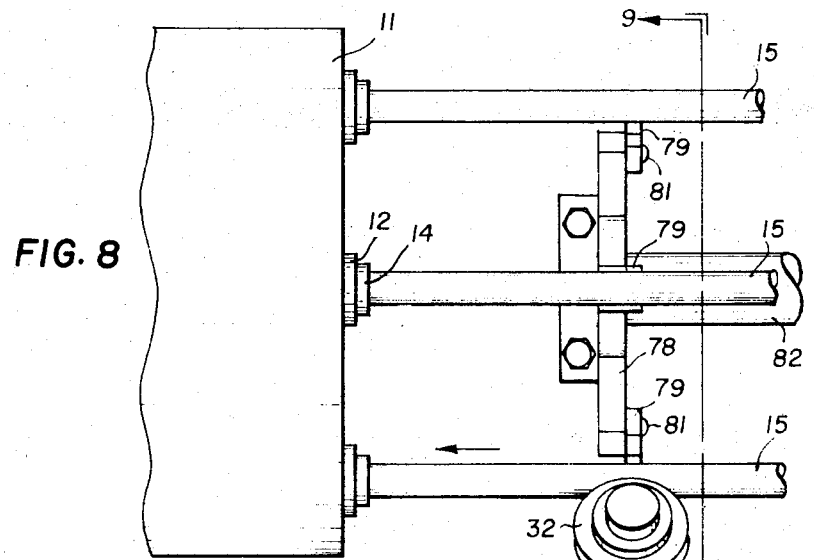
FIG. 8 is a partially schematic, fragmentary, elevational view of the control cam for the inventive device and backup plates for use in the inventive attachment.
Figure 9:
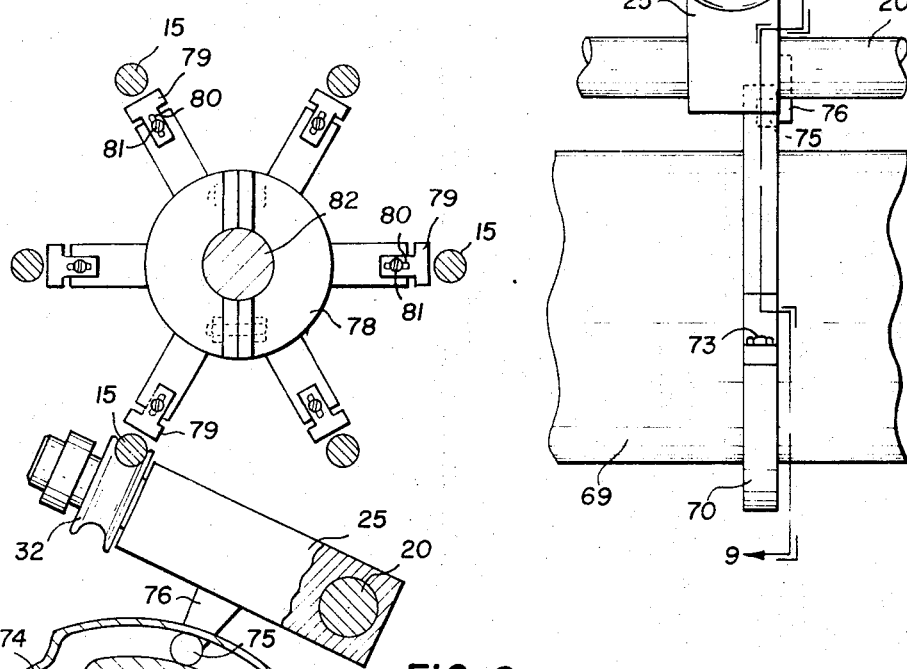
FIG. 9 is a cross section of the view of FIG. 8 taken along the line 9 — 9 thereof.
Figure 9:
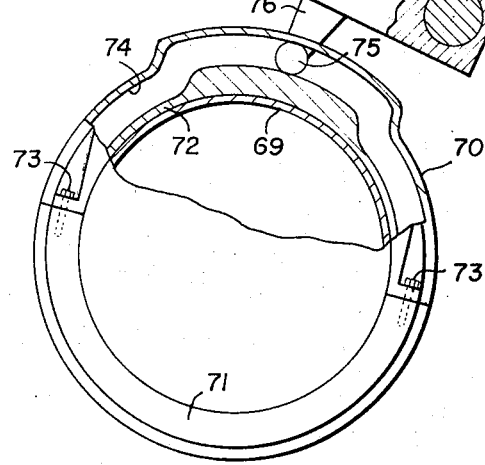

As shown in FIGS. 8 and 9, many multiple-spindle screw machines presently in operation have relatively large cam drums 69 similar to cam drum 21 as disclosed above. Cam drums 69 normally carry plates that are bolted on in segments to define cam tracks for followers that operate pusher tube type bar feeders. According to the invention, such pusher tube feeders are removed and cam drums 69 are stripped of the plates related to pusher tube feeding. In place of these, a preferred cam 70 is bolted onto cam drum 69.

Cam 70 is similar to cam 50 as previously disclosed, except for being split into two parts, 71 and 72, that are each generally semi-cylindrical to encircle cam drum 69. Screws 73 fasten cam parts 71 and 72 together on cam drum 69. The two halves of cam 70 cooperate to form a track or groove 74 for follower 75 which is secured to feeder attachment 25 through arm 76 to raise feeder 25 when follower 75 transverses the high portion of track 74. Cam drum 69 is normally rotated relatively rapidly during the feed portion of the cycle when the high part of track 74 is engaged by follower 75, and then drum 69 rotates relatively slowly during the remainder of the machine cycle. The splitting of cam 70 in two halves as illustrated greatly facilitates its attachment to existing screw machines.

Experience with the invention has shown that relatively small diameter stock bars, such as bars less than one-half inch in diameter, tend to bend when forceably engaged by drive roller 32. This problem is especially acute when the trailing or leading ends of a bar pass by drive roller 32. To alleviate this, a support spider 78, best shown in FIGS. 8 and 9, has six arms extending toward bars 15, and each arm carries a backing plate 79. Plates 79 are flat or curved and have slots 80 for adjustable connection to the arms of spider 78 by screws 81. Spider 78 is preferably split as shown for easy connection around a shaft 82 extending forward on the axis of the stock reel.

Backup plates 70 are preferably adjusted to clear their respective bars 15 by a small clearance such as 1/16 th of an inch. As drive roller 32 is pressed against a bar 15, it may bend bar 15 toward and against backup plate 79 as the halves 33 and 34 of roller 32 are spread apart for a grip on bar 15. Once this occurs, roller 32 feeds bar 15 free of backup plate 79, and bar 15 normally turns without touching backup plate 79. Backup plates 79 prevent any excess deformation of bar 15 from the force of drive roller 32.

Another improvement in the inventive attachment is a pneumatic control system to ensure accurate feeding of bars 15 and to shut off machine 10 and warn the operator for stock depletion or malfunction of the feed mechanism. This control system is schematically illustrated in FIG. 10 and specific portions of the control system are shown in FIGS. 11 - 13.

Figure 10:
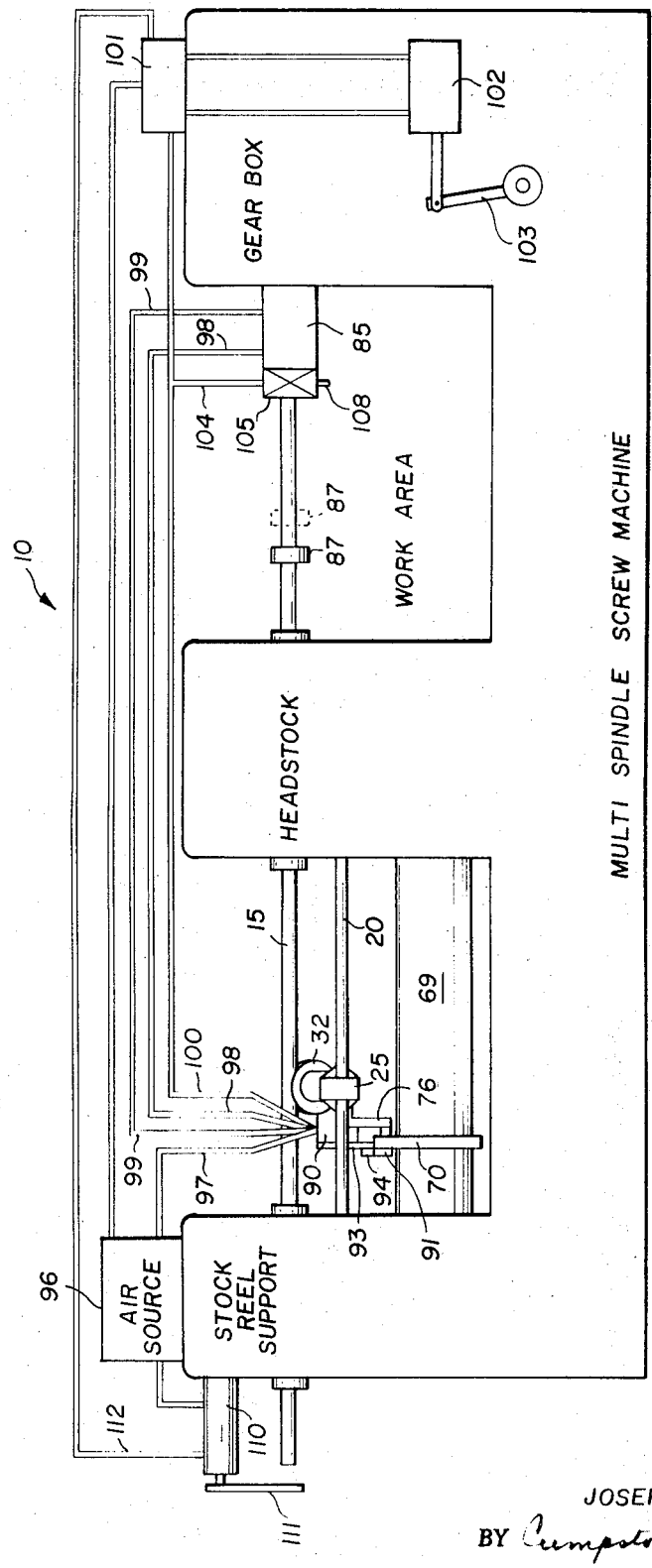
FIG. 10 is a schematic diagram of a pneumatic control system for the inventive device.

A central element of the pneumatic control system is a push-back stop 85, best shown in FIGS. 10 and 11. Pushback stop 85 is powered by an air cylinder 86 and is arranged so its axially movable stop 87 engages the forward end of a bar 15. Stop plate 87 is normally retracted to the broken-line position shown in FIG. 10, and bar 15 is initially overfed into engagement with retracted stop plate 87. Bar 15 has a tendency to bounce back from stop plate 87, but drive roller 32 continues to urge bar 15 forward into reengagement with stop plate 87. Then, air cylinder 86 is powered to drive stop plate 87 forward to its solid line position as shown in FIG. 10, to push bar 15 back to the exact position desired for machining operations. Push back stop 85 is preferably shaped to fit into the end-working tool holder for the No. 6 position of a multi-spindle screw machine where bar feeding occurs. For simplicity, only one bar is shown in the schematic drawing of FIG. 10.

Unlike conventional pusher tube feed mechanisms, the inventive feeder attachment allows a successive bar to be fed behind a preceding bar for faster changeover from a depleted bar to a new bar. This allows full use of each bar and greatly reduces the lost time in reloading new bars into the machine.

In such operation, eventually a bar remnant will exceed the feed dimension for a part by only a small amount so that the collet would have an insecure grip on the trailing end of the remnant, and the piece could be moved off axis to damage the collet and machine tooling. Push-back stop 85 prevents this by allowing an overfeed and pushing the bar back an amount sufficient to ensure that the collet has a secure grip on the bar remnant. Any remnant that only slightly exceeds the part length will be rejected as scrap during the overfeed, and any remnant that is long enough to be overfed and pushed back will have a sufficient portion of its trailing end gripped by the collet to insure that it will be held steady without damage to the collet or tools.

The operation of push-back stop 85 is greatly facilitated by the inventive attachment. An air valve 90 is secured to feeder housing 25, and a timing plate cam 91 is secured to cam 70 so that a follower 92 engages cam 91 to move an arm 93 that operates air valve 90. This affords a secure mechanical relationship between the feeding of the bar by drive roller 32 and the stopping and pushing back of the bar by push back stop 85, because both operations are controlled by portions of the same cam 70. Cam plate 91 can be adjusted relative to cam 70 through slots 94 and screws 95 so that pushback stop 85 operates in a predetermined, timed relationship with feed roller 32.

Air under pressure from a source 96 is input to valve 90 through line 97, and the output from valve 90 controls push-back stop 85. With follower 92 and arm 93 in a lower position not engaging cam plate 91, output air from valve 90 through line 98 is directed to push-back stop 85 to hold air cylinder 86 in the retracted position as shown in FIG. 11, and hold stop plate 87 in the retracted, broken-line position as shown in FIG. 10. When follower 92 rides up on cam plate 91 to move arm 93 clockwise to the position shown in FIG. 12, air is output from valve 90 through line 99 to force air cylinder 86 forward to drive stop plate 87 forward to the solid line position in FIG. 10 for pushing back bar 15 as described above.

Such pushing back occurs while drive roller 32 is in driving engagement with bar 15 to ensure that bar 15 is closely pressed against stop plate 87. After feeding and pushing back has been completed, and preferably after the collet closes on bar 15, follower 92 rides off of cam plate 91 to lower arm 93 so that the output from valve 90 is again through line 98 to cause the air cylinder 86 of pushback stop 85 to retract stop plate 87 to the broken-line position shown in FIG. 10. Also, approximately at the same time, cam 70 rocks housing 25 away from bar 15 so that roller 32 moves away from bar 15. Machine 10 then continues through its machining cycle, and drum 69 and cam 70 rotate relatively slowly until the next feed cycle occurs.

Another function of the pneumatic control system for the inventive device is to ensure that bar 15 is pushed all the way back to the desired position for machining. This also is controlled through valve 90 and push-back stop 85.

An output line 100 delivers air from valve 90 whenever arm 93 is raised in response to follower 92 riding on cam 91. The air pressure in line 100 is directed toward a trigger valve 101 that controls a pneumatic cylinder device 102 arranged for disengaging the main drive clutch 103 of machine 10.

After a brief interval, the air pressure in line 100 will trigger valve 101 to operate pneumatic cylinder 102 to disengage clutch 103 and stop the operations of machine 10. However, proper action of push-back stop 85 will bleed off the pressure in line 100 to prevent such stopping of machine 10. This is accomplished through a line 104 joining line 100 to a valve 105 in push-back stop 85.

As best shown in FIG. 11, valve 105 is a simple ball valve arranged in push back stop 85 so that when piston 106 in cylinder 86 travels its full distance to advance stop plate 87 fully, a surface 107 engages ball valve 105 to open line 104 to bleed off air pressure through valve 105 and out a slot 108 into atmosphere. This reduces the pressure in line 104 and in turn the pressure in line 100 to prevent operation of trigger valve 101, and shutting down of machine 10. Hence, every time push-back stop 85 functions as desired to push bar 15 fully back to the exact position intended, then machine 10 is allowed to continue to operate, but if through some obstruction or malfunction, push-back stop 85 fails to push bar 15 fully back to the desired position, then valve 105 will not open, the pressure in lines 104 and 100 will be maintained, and trigger valve 101 will operate air cylinder 102 to disengage clutch 103 and stop the operation of machine 10.

Another function of the pneumatic control system for the invention is to detect stock depletion and shut down machine 10 and warn the operator if this occurs. To accomplish this, an air valve 110 is operated by a sensor arm 111 to direct air from source 96 through line 112 to trigger valve 101 for operating air cylinder 102 and clutch 103 for shutting down machine 10 similarly to the shutdown previously described. Whenever sensor arm 111 detects that no bar 15 is present at the region of sensor 111, preferably just forward of the stock reel support, sensor arm 111 moves to operate valve 110 and shut down the machine. If a succeeding bar is loaded into the stock tube to follow bar 15, then sensor arm 111 detects the presence of the succeeding bar and is not operated to shut down machine 10.

As best shown schematically in FIG. 13, sensor arm 111 is preferably positioned nearly tangent to the circle described by bars 15 as they index through successive positions and is biased inward so that any time a bar is not preent in the region of sensor 111 during an indexing cycle, arm 111 will turn inward in a counterclockwise direction as shown in broken line to operate valve 110 and shut down machine 10.

The inventive bar feeder attachment offers many advantages in easy attachment to existing machines, and efficient, reliable, and accurate feeding of bars. Conventional pusher tube feeders wear out quickly, are generally inaccurate, and tend to mar the bar stock, and the inventive device avoids all these problems. Also, the inventive device has a capacity for feeding stock a far longer distance than conventional pusher tubes so that longer parts can be made if desired. Moreover, elimination of the pusher tubes allows stock diameter to increase about ¼ inch on an existing machine. Furthermore, the pneumatic control system used with the inventive feeder assures accurate feeding and prevents mishaps that might damage the machine.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the variations and adaptations to specific circumstances that can be made within the spirit of the invention.

I claim:

1. In a spindle bar machine having a hollow support spindle through which a workpiece bar is extended, with lock means for cyclically locking and unlocking the bar against longitudinal movement through the spindle, and including a machine shaft arranged parallel to but spaced from the bar and a rotating drum spaced from both the bar and the machine shaft, the improvement comprising:

an elongated housing having a journal formed on one end thereof, the journal being rotatably mounted upon said machine shaft for positioning the housing for rocking movement upon the shaft in a plane transverse to and towards and away from the bar;

a drive motor arranged within the housing and having a constantly rotating drive shaft extending outwardly of the opposite end of the housing;

a drive roller, arranged axially transverse to the bar, mounted upon and connected to the drive shaft for constant rotation therewith, the housing and drive shaft being of a length to bridge the space between the machine shaft and bar so that the roller peripherally contacts the bar, when the housing is rocked towards the bar, for exerting a longitudinally directed thrust thereon for moving the bar through the spindle;

a cam follower secured to the housing and interengaging with a cam secured upon and rotated by said rotating drum the cam being formed to move the follower and thus rock the housing towards the bar when said lock means is unlocked and permit the housing to rock away from the bar when said lock means is locked.

2. A construction as defined in claim 1, and including a cup-shaped, rotatable cover fitted over and receiving said housing opposite end;

the base of the cover being formed with a centrally located hollow mounting shaft into which the motor drive shaft extends and is secured, so that the cover rotates with said drive shaft;

said roller being fitted upon and secured to said mounting shaft with one face of the roller arranged against the base of said cover.

3. A construction as defined in claim 2, and including support bearings operatively arranged between the wall defining said cover and the portion of the exterior wall of the housing received within said cover for rotatably supporting the cover upon the housing and for thereby transmitting transverse loads applied to the roller through the cover to the housing.

4. A construction as defined in claim 2, and said roller being formed as inner and outer roller halves with the inner half arranged against said cover base and the outer half being slidably mounted upon the mounting shaft for axially sliding towards and away from the inner half;

and a peripheral, bar receiving groove formed in the peripheral edge of the roller, with each of the adjacent peripheral edges of the roller halves formed into one half of the groove;

and an adjustable spring mounted upon the mounting shaft for spring resisting movement of the outer roller half away from the inner roller half when the bar is received within said groove.

5. A construction as defined in claim 4, and said spring means comprising an annular, truncated conically shaped spring surrounding said mounting shaft and having an annular edge engaging against the outer roller half and its opposite annular edge engaged against a nut axially adjustably mounted upon said mounting shaft for adjusting the spring compressive force.

6. The construction as defined in claim 1, and said cam follower comprising a roller and said cam comprising a disk having a continuous roller receiving groove formed in one face thereof, with a portion of the groove being spaced further from the disk axis than the remainder of the groove, for rocking the roller and thereby the housing towards and away from the bar.

7. The machine of claim 6 wherein said cam is formed of a pair of generally semi-cylindrical sections secured around said drum.

8. The machine of claim 1 wherein said housing journal includes a semi-cylindrical recess in the end of said housing and a separable cap having a semi-cylindrical recess and secured to said housing.

9. The machine of claim 3 wherein said housing journal includes a semi-cylindrical recess in the end of said housing and a separable cap having a semi-cylindrical recess and secured to said housing.

10. The machine of claim 1 including a backing plate arranged adjacent said bar opposite said drive roller.

11. The machine of claim 10 wherein said backing plate is adjustable radially of said bar and normally spaced to have a small clearance from said bar.

12. The machine of claim 11 including a plurality of said spindles and bars arranged in a rotatable array, and a corresponding plurality of said backing plates arranged adjacent each respective one of said bars.

13. The machine of claim 1 including a stop arranged for engaging said bar after said movement through said spindle, and means for pushing said stop back to move said bar back a portion of said movement before locking of said locking means.

14. The machine of claim 13 wherein said pushing means is a pneumatic cylinder, an air valve is arranged to control said pneumatic cylinder, a surface on said cam is arranged for timing the operation of said air valve, and a follower is arranged for engaging said timing cam surface to operate said air valve.

15. The machine of claim 14 wherein said air valve is mounted on said housing, and said timing cam surface comprises a plate adjustably secured to said cam.

16. The machine of claim 13 including means for disengaging the drive of said machine, a trigger valve for operating said disengaging device, means for directing air from said air valve to said trigger valve, and a bleed valve arranged for bleeding off said directed air to prevent actuation of said trigger valve whenever said stop is pushed all the way back.

17. The machine of claim 13 including means for disengaging the drive of said machine, trigger means for operating said disengaging device, and a sensor arranged on said machine to sense the presence of said bar at a region where said bar is approaching said drive roller, and to operate said trigger means whenever no bar presence is sensed.

* * * * *